June 17, 1924.　　　　　　　　　　　　　　　1,497,738
W. J. ROOSE
PAN LIFTER
Filed Aug. 6, 1923　　　2 Sheets—Sheet 1
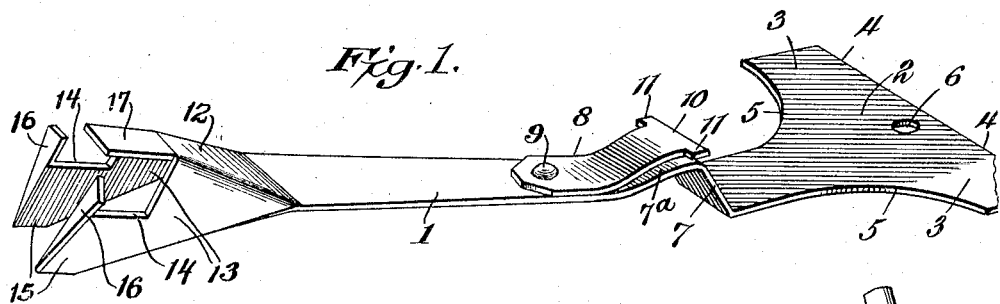
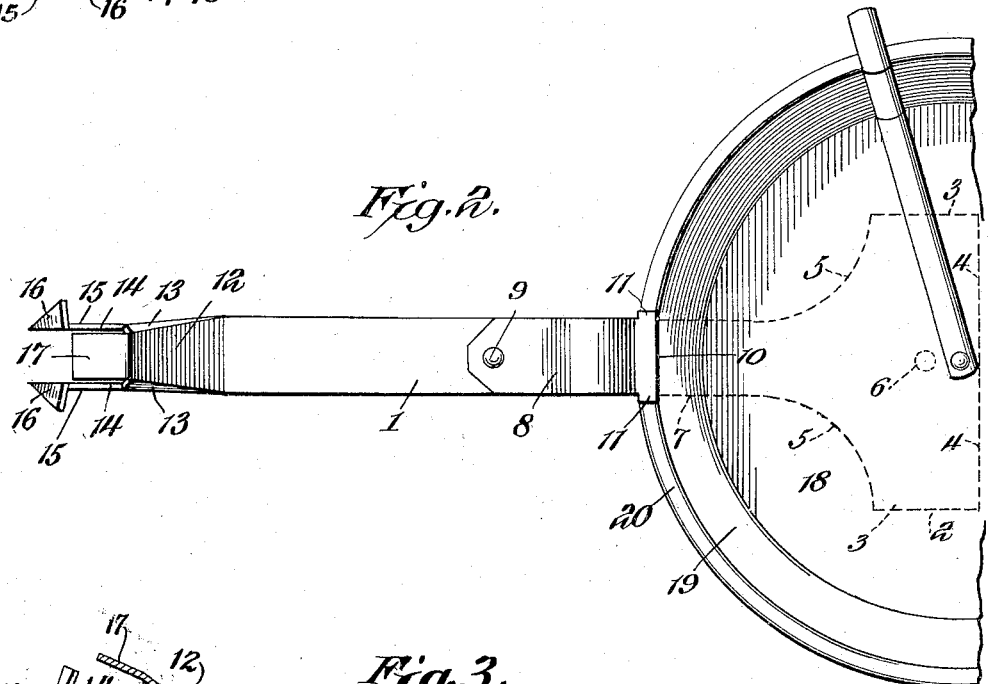
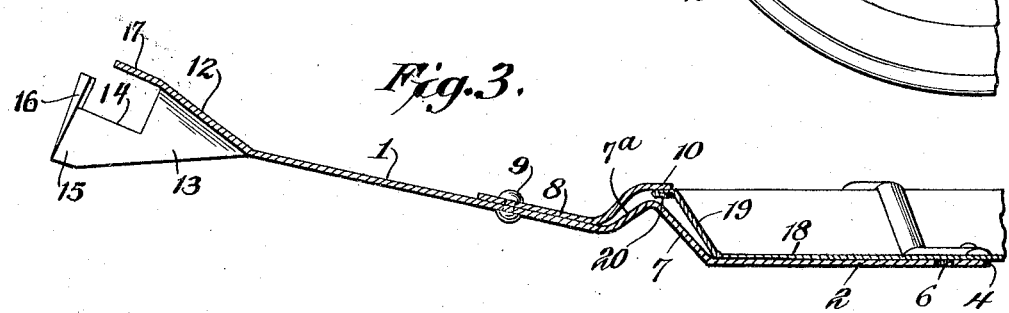
Walter J. Roose, INVENTOR,
WITNESSES
BY
ATTORNEY June 17, 1924.
W. J. ROOSE
PAN LIFTER
Filed Aug. 6, 1923
1,497,738
2 Sheets-Sheet 2
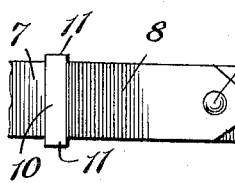
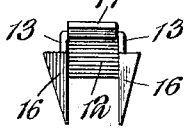
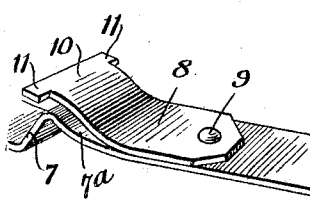
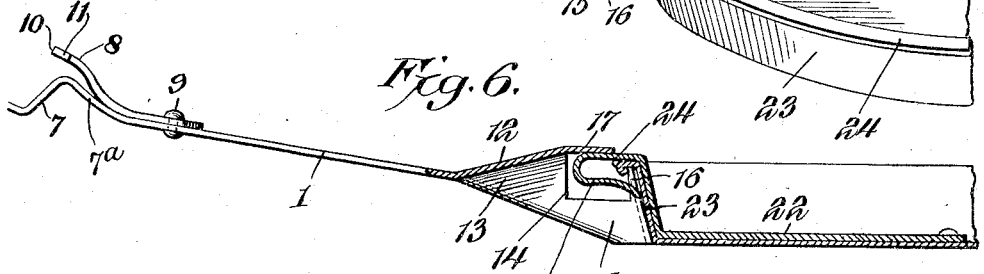
Walter J. Roose, INVENTOR
WITNESSES
BY
ATTORNEY Patented June 17, 1924.

1,497,738

UNITED STATES PATENT OFFICE.

WALTER J. ROOSE, OF FARMINGTON, MISSOURI.

PAN LIFTER.

Application filed August 6, 1923. Serial No. 655,976.

*To all whom it may concern:*

Be it known that I, WALTER JEFFERSON ROOSE, a citizen of the United States, residing at Farmington, in the county of St. Francois and State of Missouri, have invented a new and useful Pan Lifter, of which the following is a specification.

This invention relates to pan lifters.

The object is to provide a simple and cheaply-manufactured device to be used for lifting hot pans from bake ovens, especially pie pans and layer cake pans, which ordinarily have to be handled by hand with the use of a cloth to prevent burning the hands.

Another object is to provide such a lifting device which may be readily formed by stamping from suitable sheet metal, such as aluminum, and bending into proper shape, to provide a combination tool having means at one end for engaging under the flange of a cake pan having the ordinary cake removing cutter therein to rigidly and securely support the said pan for removal from the oven, and at the other end providing means for so engaging the flange of an ordinary pie pan for the same purpose, the two devices being so shaped and proportioned as to co-operate with the bevelled sides of the two different kinds of pans.

A further object is to provide in such a combination kitchen tool, means for turning pancakes, eggs or other food which requires such turning, said means being so located as to not interfere with the functioning of the lifting devices.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a perspective view of the combination pan-lifting tool.

Figure 2 is a plan view of the same applied to a pie pan, the latter being partly broken away.

Figure 3 is a longitudinal sectional view through the same.

Figure 4 is a plan view of the tool reversed and showing the cake pan lifting device applied to a cake pan.

Figure 5 is a perspective view of the same being applied to the pan.

Figure 6 is a longitudinal sectional view through the subject matter of Figure 4.

Figure 7 is a front end elevation of the cake pan lifter.

The entire device of the present invention is preferably formed of sheet aluminum of sufficient thickness to withstand the strain of lifting pies or cakes from the oven while in the pan, such metal being best adapted for this purpose for the reason that it is not easily affected by the heat, will not rust or corrode, and is readily polished and cleansed and kept in a sanitary condition, and the entire device may be easily and cheaply manufactured by a simple stamping process.

Referring more particularly to Figure 1 of the drawings, there is shown a combination tool of this character comprising a relatively narrow, elongated shank 1 having an enlarged flat head 2 formed integrally at one end of the same, said head comprising transversely disposed wings 3, with a continuous outer edge 4 at right angles to the longitudinal axis of the shank 1. The rear edges 5 of the wings are curved inwardly and merge into the side edges of the shank 1, and the head 2 thus formed constitutes a pancake, fritter or egg turner, the said edge 4 serving to provide a continuous cutting edge to be introduced beneath the article of food to be turned in a well-known manner.

Adjacent the edge 4 and in line with the longitudinal axis of the shank of the tool, there is provided a perforation 6 to allow the tool to be hung on a nail if desired, and adjacent to the curved edges 5 where merging into the shank 1, the latter is transversely bent to form an inclined rise 7, from the upper end of which the metal is bent slightly downward again to merge into the shank proper, as at 7ª.

A longitudinally disposed clip 8 is held rigidly to the shank 1 by a rivet 9 located substantially at the center of said shank, the said clip having its free end 10 located over the inclined rise or wall 7, and spaced from the upper end thereof, outwardly extending lugs 11 extending from the free end to constitute a foot for a purpose to be described.

The shank 1 is bent upwardly at an angle of substantially ten degrees from the plane of the enlarged head 2, said bend starting from the lower end of the portion 7ª, where merging into the shank.

At the other end the shank is bent slightly upwardly to form an inclined wall 12 which is narrower at its upper end than where joined to the shank, the tapering side edges having depending, angularly shaped side walls 13, whose front end portions are substantially parallel to each other as shown in Figure 2.

The side walls 13 are provided with rectangular cut-out portions 14, thus providing lower extensions 15 terminating in triangular shaped, outstanding, end wings 16 formed by bending outwardly the metal of the side walls, the outer faces of said wings having an angular relation to each other to conform to the radius of an ordinary cake pan.

The narrow, upper end of the inclined wall 12 is continued over the cut-out portions 14 in the form of a tongue 17, the outer free end of which is somewhat above and to the rear of the upper ends of the triangular wings 16, whose upper edges are located above the lower wall of the openings 14.

In the use of the device as a pie-pan lifter, the head or cake turner 2 is forced beneath the cake pan 18 (Figure 2), the edges 4 extending somewhat beyond the center of said pan and forming a lifting surface, the inclined rise or wall 7 fitting beneath the inclined wall 19 of the pan, while the flange or bead 20 of said pan rests beneath the under face of the overhanging foot 10. The weight of the opposite half of the cake pan, together with the contents thereof, serves to hold the pan in this position while the shank 1 is grasped by the hand of the operator, who may then readily lift the same from the oven without danger of burning the hand; all of which may be readily understood by reference to Figures 1, 2 and 3 of the drawings.

In using the device for lifting cake-pans, the other end of the same is utilized and, with the hand grasping the shank of the tool in the same manner, said tool is tilted slightly, as shown in Figure 5 so that the outstanding portion 21, constituting a handle for operating the severing device 22 found in a great many cake-pans now in general use, is located beneath the tongue 17 of the device, and the arcuate outer faces of the end wings 16 abutting against the outer face of the peripheral wall 23 of the cake-pan, the upper edges of said wings fitting beneath the marginal flange 24. The inturned edge of the flange 24 prevents the wings from becoming disengaged from the pan, and the tongue 17 prevents the device from dropping, with the result that the cake pan and its contents may be safely lifted from the oven without danger of burning.

From the foregoing it will be seen that a simple, cheaply manufactured, and durable device has been provided which may be used to lift pie and cake pans from ovens, or for turning cakes, or other articles of food, and that the same may be easily and quickly attached or detached for use, and that when either end of the device is used for lifting a pan, or the cake turner is in use, the hand of the operator is elevated above the heated parts of the stove by reason of the angular relation of the shank, or handle, to the ends of the device so that there is no danger of burning the hand.

What is claimed is:

1. A device of the class described, comprising a shank constituting a handle having a head at one end to engage beneath a pie pan, said shank being first bent upwardly at an inclination beyond the head to substantially accord with the inclined rim of the pie pan and then bent downwardly also at an inclination but in a reverse direction to form an elevated angular portion, the remainder of the shank being straight and extended upwardly at an inclination, whereby the handle portion of the shank is elevated above said head, a longitudinally disposed spring clip riveted at one end to the straight portion of the shank and having an intermediate bend terminating in a foot which overhangs and is spaced from the elevated angular portion of the shank, so that the rim of the pan may be inserted in the space between the foot of said clip and said angular portion of the shank, the bottom of the pan resting upon said head.

2. A device of the class described comprising an elongated shank constituting a handle, said shank being bent at one end to form an outwardly and upwardly inclined wall tapering towards its outer end and terminating in a horizontal tongue, depending angular side walls carried by the inclined wall and having cut-out portions located beneath the side edges of the tongue, said side walls having their front ends bent outwardly to form wings having their front faces in the arc of a circle corresponding to the radius of a cake-pan.

3. In combination with a cake pan having a severing device provided with an outstanding handle, a lifting element comprising a shank formed at one end with an inclined wall terminating in a projecting tongue to engage the upper wall of said handle, the side walls of said shank being spaced from each other and cut out to form lower extensions, and end wings extending outwardly from the extensions and spaced by the cut-out portion therefrom so as to engage beneath the rim flange of the pan.

In testimony that I claim the foregoing as my own, I have hereto affixed my signature.

WALTER J. ROOSE.